Jan. 16, 1934.     T. A. MITCHELL     1,943,339
METHOD OF TREATING SILVER BEARING ORES
Filed Oct. 27, 1931
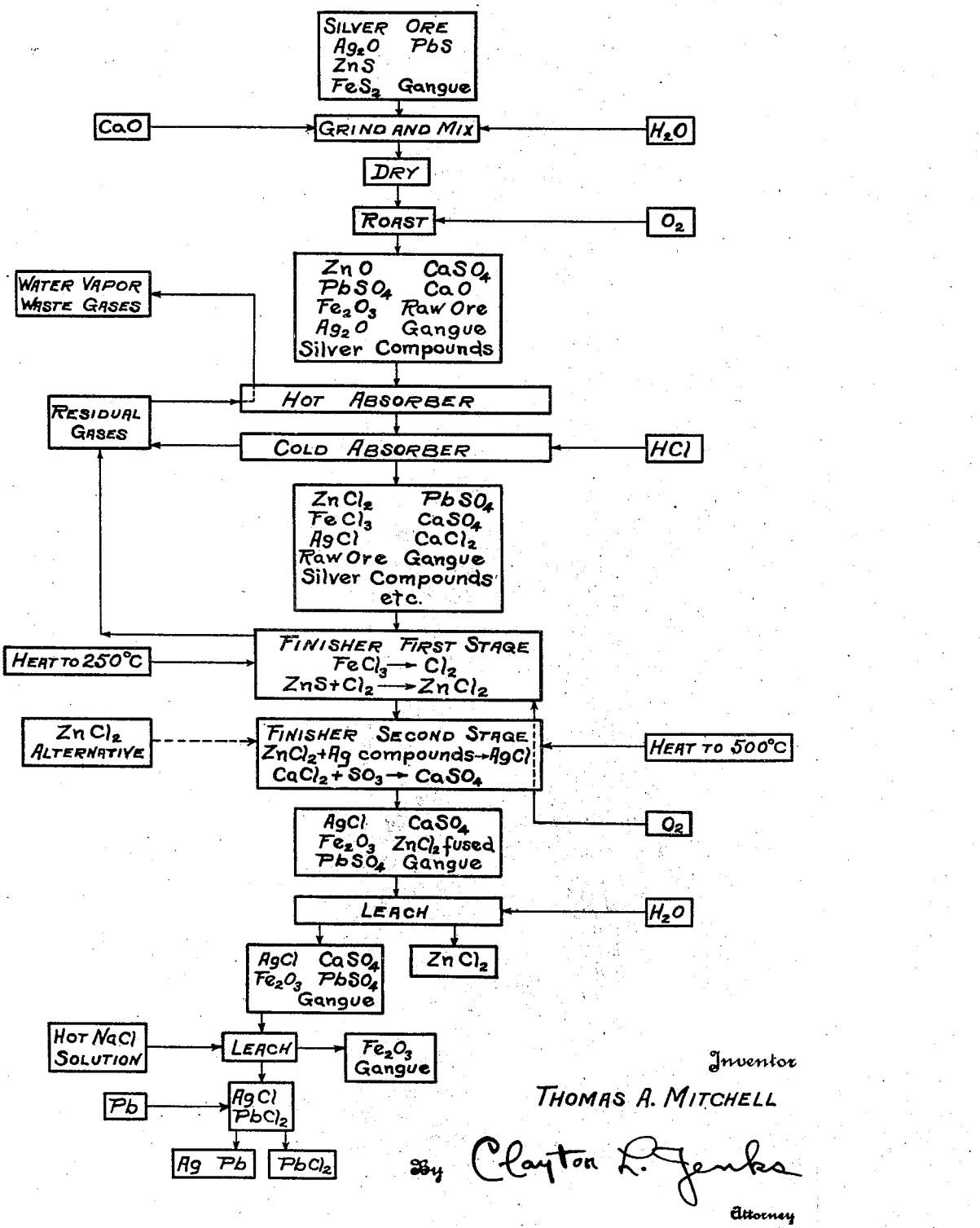
Inventor
THOMAS A. MITCHELL
By Clayton L. Jenks
Attorney Patented Jan. 16, 1934

1,943,339

UNITED STATES PATENT OFFICE 1,943,339

METHOD OF TREATING SILVER BEARING ORES

Thomas A. Mitchell, Denver, Colo., assignor to Lafayette M. Hughes, Denver, Colo.

Application October 27, 1931. Serial No. 571,459

15 Claims. (Cl. 75—67)

This invention relates to a method of treating silver-bearing ores, and more particularly to chloridizing complex sulfide ores containing compounds of silver and other valuable metals.

One standard method for recovering silver from a complex sulfide ore, such as one containing lead, zinc, iron and silver, has involved roasting the ore in order to remove the sulfur and leaching the material with suitable reagents for extracting the silver. This and other methods of the prior art have usually shown a recovery of only 30 or 40% of the silver. Recent research by a governmental bureau has indicated that if such an ore is treated by a salt-roasting method, the silver recovery may be as high as 90%. The use of a salt-roast is, however, open to question on account of the cost involved, and particularly when the content of silver in the ore is low, as well as various problems inherent in a direct treatment of a sulfide ore by a chloridizing agent. It is important to employ a process which does not require a special treatment for recovering the silver and which is suitable for extracting all of the valuable metals from the ore. The cost of recovering the silver should be allocated to the other metals, so that the only cost to be charged against the silver recovery would be that involved in separating the silver from the other metals after the preliminary stages of roasting and leaching have been accomplished.

It is the primary purpose of this invention to provide a simple, efficient and economical method of recovering silver from complex ores, whether it be present in large amounts or as a very low content, and at the same time to so treat the ore that the other valuable metals may be readily recovered.

When a complex sulfide ore containing silver is roasted, the silver sulfide tends to be oxidized to the sulfate form, but at the high temperature of roasting required for treating other ore ingredients, there appears to be a tendency towards the formation of silver oxide or even of metallic silver. I have observed that the roasted ore particles containing silver or a silver compound show a globular form, and there are indications that the silver has combined with other constituents of the ore. The nature of this combination is not understood, but from the globular appearance of the ore, it is thought that the silver, in either an oxidized or a metallic condition, has fused physically to the ore particles or to certain ingredients thereof. If iron, antimony or arsenic oxides are present, these may serve to oxidize any metallic silver present, and this silver oxide may combine chemically with these or other materials. It seems to be evident that the silver or silver oxide readily fuses with iron oxide or with silica and so forms globules containing these various substances. As a consequence of this globular or fused condition of the silver, it does not present any large surface area capable of being reached by leaching reagents, which are employed for dissolving silver from the ore. Some of the silver may be found in a roasted ore in chemical combination with iron, manganese or other ore metals or with the silicate radical and so be present as a refractory substance which is not easily chloridized. Consequently a standard chloridizing treatment may serve to recover only the easily chloridized portion of the silver and not succeed in rendering the refractory portion soluble.

It is accordingly a further object of this invention to cause silver to remain in the roasted ore in such a condition that it may be easily attacked by leaching or gaseous reagents and thus be readily converted to a soluble compound.

Another object is to provide an efficient method of chloridizing the refractory silver content of an ore as well as the easily chloridized portion and to provide a method whereby various metals of the ore may be extracted as chlorides in the same process.

A still further object is to provide a method of separating silver from a complex ore containing an iron compound and to produce an iron free solution of silver chloride. Other objects will be apparent in the following disclosure.

I have found that these detrimental conditions may be obviated and a very high recovery of the silver compound in a simple or a complex sulfide ore may be obtained by a series of steps comprising roasting the ore in such a manner as to produce a pulverulent mass in which the individual particles are easily permeated by reagents and the silver is not globulized, and then chloridizing the silver content of the roast and preferably by means of a metal chloride capable of providing chlorine or the chloride ion for the purpose.

The silver content of the ore may be prevented from forming a sulfate during the roasting operation and be caused to remain in a metallic or oxide state, neither combined chemically with other ore ingredients nor physically fused thereto, in which the particles have a large surface area exposed for subsequent contact with gaseous or liquid reagents employed for converting the silver content of the ore to a soluble compound. This is accomplished by roasting the silver-bearing ore in an intimate association with a protective compound, such as the oxide or hydroxide of the alkaline earth metals, calcium, strontium or barium, which will protect the silver content of the ore and prevent it from combining physically or chemically with adjacent constituents of the ore. For this purpose, I propose to coat the ore in a finely divided condition with alkaline earth metal oxide or hydroxide and to roast the ore while the silver content is surrounded with this protective coating. Owing to the strong affinity of the alkaline earth metal for any available sulfate radical, the silver will be prevented from going to the sulfate form while being roasted and it will be present as an oxide or in the metallic condition, depending upon other conditions of the roasting operation. Calcium oxide is the preferred reagent, and this, or the sulfate produced therefrom, serves as a protective coating on the silver portion of the ore particles during the roasting operation and prevents it from contacting with other ore ingredients and from becoming fused thereto.

This alkaline earth material, such as the oxide of calcium, is employed in amount sufficient to react with all of the available sulfate radical derived from the ore which does not escape up the chimney or which does not combine with such elements as lead capable of reacting preferentially therewith. Consequently, by taking up this available sulfate radical, the alkaline earth metal forces such elements as zinc, iron, copper and silver to form oxides and prevents their going to the sulfate form. Lead may be present as a sulfate as well as an oxide, owing to the fact that it has a strong affinity for the sulfate radical.

This protective coating may be placed on the ore particles by intimately mixing the ore in a very finely divided condition with lime in the presence of water, and thereafter drying the mixture, thus causing a coating of calcium hydrate to be formed on each one of the small ore particles. When roasted, this coating is converted to the oxide. If the ore has been initially sulfated to some extent and silver or zinc sulfate, for example, is present, the calcium hydroxide reacts therewith to form calcium sulfate and to leave the silver and zinc in a chloridizable compound, this reaction taking place during the mixing of the ore and lime with water. Such calcium sulfate as is thus formed will be hydrated; hence, when the ore mixture is subsequently dried and roasted, the water of hydration of the calcium hydrate and the water of crystallization present in the calcium sulfate will be driven off, thus opening up pores within the ore particles.

The alkaline earth material, therefore, serves various functions in this process. It reacts with available sulfate radical and forces silver, zinc, copper and other metals to go to the oxide form during the roasting operation. It serves to make the roasted material open and porous in structure. It prevents the ore particles from being sintered or fused together and causes them to remain in a pulverulent condition. It prevents globulizing of the silver and leaves the silver in an ore particle which has an extensive surface suitable for chloridizing or for being directly leached from the roasted ore. It also serves, during the chloridizing operation, as explained below, to take up all of the available sulfate radical and force the zinc, silver and other metals to go wholly to the chloride form.

Referring to the drawing, I have there shown diagrammatically the main steps involved in treating a complex sulfide ore containing silver, lead, zinc and iron compounds. We may assume that the ore being treated has approximately the following analysis, determined as percentages by weight:

| Total sulfur | Fe | Pb | Cu | Zn | CaO | MgO | SiO₂ | Ag |
|---|---|---|---|---|---|---|---|---|
| 33.1% | 30.9 | 0.8 | 0.4 | 15.2 | 1.0 | 0.4 | 2.2 | 10 oz. per ton. |

In order to have sufficient lime present for the purposes above explained, I calculate it as the molecular equivalent of the various reactable metals in the ore which might form either sulfates or oxides during the roasting operation, and I provide an excess of lime in order that there may be sufficient for the chloridizing operation. I prefer that the lime make up at least 5% of the mass. For an ore of the above formula, I find that 83 parts of ore to 17 parts by weight of lime will produce satisfactory results. It, however, is to be understood that the lime is needed only in amount sufficient to take up the available sulfur trioxide which does not go up the chimney and which is not taken up preferentially by lead or other elements. Hence, an analysis of the roasted and chloridized product for any free sulfate radical not combined with lime will indicate whether or not there is sufficient lime present.

In order that this lime may be in intimate contact with the ore particles, I prefer to grind the ore initially to a powdery condition and preferably to one which will pass through a sieve of 150 meshes to the linear inch. Calcium oxide in a powdered condition is mixed with this material and preferably in the presence of water. This mixing may be accomplished in a ball mill so that the lime and the ore will be brought into very intimate contact, the lime forming calcium hydrate in the presence of water. Then, the slurry is dried and broken into a granular or pulverulent condition again, after which it is roasted while being agitated to minimize sintering. When the material is dried, the water of hydration is removed from the calcium hydrate, thus leaving lime intimately associated with the ore as a coating over the ore particles. It will also be understood that the drying and roasting operations, which serve to drive off the water of hydration and any water of crystallization present in the calcium hydrate or sulfate, thus further aid in opening up a porous structure. This lime is now in intimate association with the silver and keeps the silver from contacting with other ore ingredients and prevents it from going to the sulfate form when the silver sulfide is roasted in an oxidizing atmosphere. The lime thus serves in a large measure to keep the silver from fusing or otherwise physically or chemically uniting with other ingredients of the ore and so leaves it chiefly as an oxide or sometimes in the metallic state, in which forms it may be easily chloridized. If some refractory compounds are present or form in spite of the presence of the lime, the special chloridizing treatment employed will chloridize them.

The temperature of the roasting operation will depend upon the nature of the material being treated, but it will preferably be kept sufficiently low so as to minimize any danger of the ore particles becoming sintered together. It is ordinarily sufficient to allow the ore to be roasted autogenously or at that temperature which is attained when the sulfide sulfur of the ore is permitted to burn freely in an oxidizing atmosphere. If desired, heat may be supplied to the roaster, as by means of a gas or a coal flame, in order to aid the roasting operation. I find that for the average type of ores, such as the one described above, the roasting temperature need not go higher than 1000° C. and the operation may be carried on at a temperature as low as 600° C. It is also to be noted that the roasting operation need not be carried on to completion, since 1 or 2% or even as high as 5% of sulfide sulfur may be left in the ore and it will be effectively cared for in the subsequent chloridizing operation as hereinafter described.

As the result of this roasting operation, the zinc, silver, copper and iron have gone to the oxide form, although it is possible that the silver may be in a metallic form as well, while the lead is presumably present as a sulfate intermixed with some oxide. The rock or ore gangue is present as silica and various silicates, while there may be some very small amount of ore metal values combined with other materials, such as zinc ferrite or ferrate, zinc silicate and the like. The silver may be present to some extent as silver silicate or combined with iron or manganese, such as silver manganite. The calcium is present both as a sulfate and as an oxide, while manganese and magnesium may be present as oxides.

As a further feature of my invention, I propose to chloridize a silver bearing material, whether roasted as above described or prepared in any suitable method, by means of steps which will convert to a soluble chloride form not only the easily chloridized silver content of the ore but also the refractory or difficultly chloridized compounds. The roasted ore as above described will be taken as an example of ore materials which may be chloridized by my process. The silver oxide of this material may be easily converted to a chloride by means of hydrochloric acid, either liquid or gaseous, or by other suitable reagents providing chlorine or the chloride ion. For treating the refractory silver content, I find it effective to heat the ore material in the presence of a chloridizing agent to a comparatively high temperature, the degree of which depends upon the nature of the compounds in the ore as well as the reagent used. For the chloridizing reagent I prefer to employ the chloride of a metal which is capable of providing chlorine or the chloride ion, and particularly the chlorides of the metals of a group containing zinc, iron, copper and manganese, commonly found with silver in a complex ore, which are capable of combining with oxygen to provide chlorine or of reacting directly at a high temperature with refractory silver compounds to produce silver chloride. The chloridizing step is also carried on in the presence of the residual CaO or CaCl$_2$ to insure that all of the sulfide sulfur left in the roasted material, which forms SO$_3$ or available sulfate radical, is fixed as insoluble calcium sulfate, thus preventing the formation of the sulfate of silver and other metals.

I do not wish to be limited to any particular theory of operation, but, considering zinc chloride as the reagent, I believe that at a high temperature, and preferably above 365° C. (its melting point) zinc chloride is capable of combining with oxygen to form zinc oxychloride and chlorine or of reacting directly with the silver compound. At this temperature, the fused zinc chloride or the nascent chlorine is in intimate contact with the silver ore for reaction therewith. I have found that for a zinc, iron, silver sulfide ore the temperature should be well above the dissociation point of ferric chloride and that an efficient temperature for this operation is about 500° C.; but other chlorides such as ferric chloride which develop chlorine at a lower temperature may be employed at somewhat lower temperatures, depending upon how refractory the silver compound is.

A complex ore containing zinc, such as the one above described, may have substantially all of its silver content rendered soluble if the ore is first roasted and treated with hydrochloric acid to form zinc chloride and then heated in the presence of oxygen to a temperature of 500° C. or more. While it is feasible to add zinc chloride to an ore material containing a refractory silver compound, it is preferable to add zinc sulfide to the ore prior to roasting, if the zinc content is not high enough. However, the silver content in most ores containing zinc is low and no further amount of reagent is required. If the ore is a complex one, as above described, and contains zinc, iron, lead and other valuable metals, then I prefer to chloridize the easily treated ingredients of the ore by means of hydrochloric acid gas or chlorine or both. The hydrochloric acid gas serves to form zinc, copper and iron chlorides from the oxides of these metals. Thereafter, the partially chloridized material is heated in the presence of air to a temperature in excess of 500° C., and under this condition the zinc or other metal chloride, and possibly assisted by the other chlorodizing agents present, will react with the refractory silver compounds to form silver chloride.

Since there may be various other difficultly chloridized materials, such as zinc silicate or ferrite, in the complex ore, I also propose to employ chlorine and preferably nascent chlorine for rendering these other metals soluble. This is preferably accomplished prior to the final treatment of the silver portion of the ore, or as a part of the step, by employing ferric chloride and oxygen at a temperature of about 250° C. to develop chlorine. The ferric chloride has been produced in the initial chloridizing of the above described ore, and the quantity of this reagent present will depend upon the preliminary chloridizing treatment, it being noted that the zinc oxide will take up the hydrochloric acid gas first and that ferric chloride will be formed thereafter, if the temperature is below the dissociation point at which ferric oxide is formed.

If the ore is of the complex type above described, my preferred method of carrying on the chloridizing operation is as folows: The roasted material is caused to pass through a suitable apparatus known as an absorber and hydrochloric acid gas is passed in counterflow relation to the ore material. As a result, zinc oxide is converted to zinc chloride, and when the zinc oxide content of the ore has been satisfied, then ferric chloride will also be formed. These two reactions are carried on in two stages, in which the hot ore coming from the roaster is passed in counterflow relation to a current of strong HCl gas. The hot ore, in the first or hot absorber stage, meets the residual gases which come from the second or cold absorber stage. The flow of gases through the hot absorber serves to remove water formed by the reactions, while in the second stage such water as remains serves to aid in the final finisher stage. This process of absorbing chloride ion is carried on at a temperature below the dissociation point of ferric chloride and preferably at a temperature of about 80° C., which is satisfactory for removing enough water to insure proper control of the moisture content in the absorber. During this treatment, the zinc chloride or hydrochloric acid may react with such silver or silver oxide as is present in the ore and produce silver chloride, while any zinc oxide thus formed will be converted to zinc chloride by the hydrochloric acid present.

The material is passed from the absorber to the finisher, in which the temperature of the material is raised to a point at which ferric chloride is not stable in the presence of oxygen. Air is admitted to this chamber, and under oxidizing conditions, ferric chloride forms ferric oxide and nascent chlorine. This chlorine being in very intimate association with the ore particles serves to chloridize any zinc sulfide, silicate, ferrate or ferrite, and other difficultly chloridized materials. This operation is aided by the fact that water has been formed during the previous absorbing operation, in which zinc and iron oxides and hydrochloric acid combine to form water and zinc and crystalline hydrated iron oxides When the ore is heated, the ferric chloride melts and dissolves in its water of crystallization and so serves to bring the ferric chloride into intimate association with the ore particles, so that when the mass is heated, the ferric chloride and the nascent chlorine evolved therefrom are in very close contact with the ore and are thus able to attack the difficultly chloridized materials readily.

The temperature in the finisher is gradually raised to 500° C. at which the zinc chloride is fused, while the iron is present only as ferric oxide. At this temperature the zinc chloride is believed to form zinc oxychloride and chlorine and the latter to attack the manganite, silicate or other refractory compounds of silver which may be present. In the absorber and finisher, the available sulfate radical, or $SO_3$, is taken up by the $CaCl_2$ and thus fixed as an insoluble alkaline earth metal sulfate which goes with the residue.

Thereafter, the silver may be extracted by suitable methods and preferably by one which produces an iron free solution containing silver chloride. To this end, the chloridized ore may be first treated with water or a suitable solvent to dissolve the soluble zinc chloride and leave the lead and silver compounds in the ore residue. The residue is then treated with a hot strong solution of sodium chloride which has not been acidulated, so as to dissolve the silver and lead chlorides and to convert such lead sulfate as is present to a chloride. Owing to the absence of acid, iron is not dissolved. The brine containing the lead and silver chlorides may be passed over metallic lead to precipitate the silver thereon and thus leave the lead chloride in solution. The separation of these elements may be accomplished otherwise in accordance with standard procedure and various other silver solvents may be employed.

It will now be appreciated that the two primary steps of this process involve coating the ore particles with a protective agent which will not only prevent the silver from going to the sulfate form but will cause it to remain in an easily attackable, non-globulized condition, which is not combined with or fused to the other ore constituents, and finally chloridizing all of the silver, whether oxide or a more refractory compound, by heating it to a high temperature.

and preferably above 500° C., in the presence of a chloridizing agent and preferably zinc chloride or other equivalent material capable of reacting at that temperature to provide chlorine or the chloride ion for attacking the refractory silver content of the ore. It will be understood that the formation of refractory complex compounds containing silver is largely prevented by the use of lime and a low temperature roasting operation, but that in certain cases if the ore is capable of being easily roasted without danger of sintering or of developing refractory compounds, the lime may be omitted. Likewise, the lime serves to prevent the formation of undesired ore metal sulfates during the chloridizing process. Various other modifications of the process may be adopted depending on the nature of the ore being treated. For example, the lime roasting treatment may serve to keep substantially all of the silver in an easily chloridized condition, and in that case a suitable chloridizing treatment other than the high temperature finisher operation herein described may be adopted. The above described combination of steps is however preferred for the complex ores containing large percentages of lead, zinc and the like and but a small amount of silver. Also, the step of heating the silver bearing roasted ore may be accomplished either in the finisher as above described or in a separate muffle. It is further to be understood that the claims are not to be interpreted as limited to any particular theory of operation, but are to cover broadly the method herein set forth, whatever theory may be applicable thereto.

Various features of this chloridizing process are covered broadly in my copending application Serial No. 687,827 filed September 1, 1933.

Having thus described my invention, what I claim as new and desire to secure by Letters Patent is:

1. The method of treating a complex ore containing sulfides of silver and other ore metals, comprising the steps of coating the ore in a finely divided condition with the oxide of an alkaline earth metal, roasting the coated material under conditions required to remove the sulfur from the silver sulfide and producing alkaline earth metal sulfate intimately associated with the silver-bearing portions of the ore particles, and thus minimizing any tendency for the silver to become globulized or to contact with other portions of the ore and physically or chemically combine therewith, and thereafter treating the roasted ore to convert the silver to a soluble compound and recovering the same.

2. The method of treating a sulfide ore containing a silver compound comprising the steps of roasting the ore in a finely divided condition and in intimate mixture with an alkaline earth metal oxide which is present in amount sufficient to produce a pulverulent material having an open structure capable of being readily permeated by reagents and thereafter chloridizing the roasted ore at a temperature at which refractory silver compounds are converted to silver chloride.

3. The method of treating a sulfide, silver-bearing ore according to claim 2, in which the material being chloridized is heated to a final temperature in excess of 500° C. to complete the chloridization of the silver compounds.

4. The method of treating a complex ore containing silver sulfide comprising the steps of mixing the ore in a finely divided condition with alkaline earth metal oxide in the presence of water, drying the ore mixture and roasting it in a finely divided condition under temperature and oxidizing conditions which result in the formation of an ore particle containing silver or silver oxide which has an extensive surface area exposed for contact with reagents, then heating the roasted ore with zinc chloride at a temperature above the fusion point of zinc chloride and forming silver chloride and subsequently recovering the latter.

5. The method of recovering silver from a complex sulfide ore containing the sulfides of silver and a metal of the group consisting of zinc, iron, copper and manganese, comprising the steps of roasting the ore under oxidizing conditions, then treating the roasted material with hydrochloric acid gas to form a chloride of said metal, heating the partially chloridized material in the presence of an alkaline earth metal chloride added for the purpose and proportioned to react with the available sulfate radical, while supplying oxygen thereto, and raising the temperature to a point above 365° C. and causing a refractory silver compound to be chloridized.

6. The method of recovering silver from a complex sulfide ore containing sulfides of zinc, silver and a metal of the group consisting of iron, copper and manganese, comprising the steps of roasting the ore to a condition in which it contains both an easily chloridizable and a refractory compound of silver, chloridizing the easily converted compounds of the ore to form zinc chloride and a chloride of said group metal, heating the partially chloridized material in the presence of oxygen and alkaline earth metal chloride provided for the purpose, and gradually raising the temperature to a point above 365° C. and causing the refractory silver compound to be converted to silver chloride.

7. The method of treating a sulfide ore containing compounds of silver, zinc and a metal of the group containing iron, copper and manganese, comprising the steps of roasting the ore in the presence of sufficient alkaline earth metal oxide provided to fix the available sulfate radical, subjecting the roasted material to a chloridizing agent to form chlorides of zinc and said metal and heating the material under controlled conditions in the presence of oxygen to a temperature above 365° C. and forming silver chloride from a refractory silver compound.

8. The method of treating a sulfide ore containing silver sulfide, comprising the steps of roasting the ore in the presence of an alkaline earth metal compound added and intermixed therewith which is capable of and is proportioned for reacting with the available sulfate radical and thereafter heating the roasted material in the presence of oxygen and zinc chloride to a temperature above 365° C. and converting a refractory silver compound to the chloride.

9. The method of treating an ore material containing silver sulfide or a refractory silver compound, comprising the step of heating the material in the presence of oxygen, zinc chloride and alkaline earth metal chloride to a temperature above the fusion point of zinc chloride and causing the formation of silver chloride, said alkaline earth metal chloride having been furnished in amount sufficient to effect the fixation of any available sulfate radical as alkaline earth metal sulfate.

10. The method of chloridizing a silver bearing sulfide ore comprising the steps of roasting the ore with air to remove the major portion of the sulfide sulfur, providing the ore material with zinc chloride to chloridize the silver and an alkaline earth metal compound added for the purpose which is capable of and proportioned for fixing the available sulfate radical, chloridizing the residual sulfides in the ore, and finally heating the ore mixture to a temperature above 365° C. and converting the refractory silver compounds to silver chloride.

11. The method of treating a complex sulfide ore containing iron, zinc, lead and silver comprising the steps of roasting the ore under low temperature oxidizing conditions to remove sulfide sulfur and provide a pulverulent, non-sintered material containing lead sulfate, residual sulfides, ferric oxide and silver values, introducing into the roasted material while in a substantially dry and gas-permeable condition gaseous reagents containing hydrochloric acid gas to convert the zinc and ferric oxides to chlorides, then heating the material to a temperature below 385° C. and only with air provided in amount sufficient to convert any iron chloride present to ferric oxide and nascent chlorine and thereby maintaining the ore in a gas-permeable, substantially dry and unfused condition and chloridizing the residual ore metal sulfides which are present, and finally raising the temperature of the pulverulent ore material to a point above 365° C. and in the vicinity of 500° C. to fuse the zinc chloride and convert refractory silver compounds to the chloride.

12. The method of claim 11 in which the zinc chloride is thereafter dissolved from the ore and the residue is then leached with a hot, acid-free solution of sodium chloride to recover silver and lead as chlorides and separate them from the ferric oxide.

13. The method of claim 11 in which the ore material is chloridized in the presence of an alkaline earth metal compound which is capable of and is proportioned for fixing the available sulfate radical as an alkaline earth metal sulfate and causing the zinc and silver to appear in the resultant solutions wholly as chlorides.

14. The method of treating a complex pyritic silver-bearing sulfide ore comprising the steps of roasting the ore under low temperature oxidizing conditions to burn off sulfide sulfur and provide a pulverulent, non-sintered material and adding to the ore material a compound of zinc which provides zinc chloride during the process in quantity sufficient for chloridizing the silver, treating the ore with chloridizing agents to convert ore metal values to chlorides, heating the material with air to convert any iron chloride present to ferric chloride, thereafter heating the ore material with the zinc chloride to a temperature above 365° C. and in the vicinity of 500° C. and thereby form silver chloride from the silver values present.

15. The method of treating a sulfide ore containing silver and lead according to claim 14 which comprises forming lead sulfate and lead chloride as the result of the roasting and chloridizing steps, and thereafter leaching the material with a hot, acid-free solution of sodium chloride and thereby forming a solution of lead and silver chlorides free from soluble iron.

THOMAS A. MITCHELL.

CERTIFICATE OF CORRECTION.

Patent No. 1,943,339.                                                          January 16, 1934.

THOMAS A. MITCHELL.

It is hereby certified that error appears in the printed specification of the above numbered patent requiring correction as follows: Page 4, line 25, for "oxides" read chlorides; and that the said Letters Patent should be read with this correction therein that the same may conform to the record of the case in the Patent Office.

Signed and sealed this 25th day of September, A. D. 1934.

Leslie Frazer (Seal)

Acting Commissioner of Patents,